(12) United States Patent
Gilbert et al.

(10) Patent No.: US 6,323,858 B1
(45) Date of Patent: Nov. 27, 2001

(54) SYSTEM FOR DIGITALLY CAPTURING AND RECORDING PANORAMIC MOVIES

(75) Inventors: Scott Gilbert, Tucson, AZ (US); David J. Kaiman, Portland, OR (US); Michael C. Park, Portland, OR (US); G. David Ripley, Portland, OR (US)

(73) Assignee: iMove Inc., Portland, OR (US)

( * ) Notice: Subject to any disclaimer, the term of this patent is extended or adjusted under 35 U.S.C. 154(b) by 0 days.

(21) Appl. No.: 09/338,790

(22) Filed: Jun. 23, 1999

Related U.S. Application Data

(63) Continuation-in-part of application No. 09/310,715, filed on May 12, 1999.
(60) Provisional application No. 60/085,319, filed on May 13, 1998.

(51) Int. Cl.[7] .................................................. G06T 15/00
(52) U.S. Cl. .............................. 345/419; 348/36; 348/38; 348/39; 348/47; 345/418
(58) Field of Search ................................... 345/419, 418; 348/36, 39, 38, 159, 218, 42, 47

(56) References Cited

U.S. PATENT DOCUMENTS

| | | | |
|---|---|---|---|
| 5,023,725 | * | 6/1991 | McCutchen ............................ 358/231 |
| 5,130,794 | * | 7/1992 | Ritchey ................................... 358/87 |
| 5,235,198 | * | 8/1993 | Stevens et al. ........................ 257/232 |
| 5,329,616 | * | 7/1994 | Silverbrook ............................ 395/164 |
| 5,355,450 | * | 10/1994 | Garmon et al. ........................ 395/162 |
| 5,677,981 | * | 10/1997 | Kato et al. ............................. 386/112 |
| 5,886,745 | * | 3/1999 | Muraji et al. .......................... 348/448 |
| 5,933,137 | * | 8/1999 | Anderson ............................... 345/328 |

* cited by examiner

Primary Examiner—Mark Zimmerman
Assistant Examiner—Mano Padmanabhan
(74) Attorney, Agent, or Firm—Elmer Galbi

(57) ABSTRACT

The present invention provides a very flexible, digital system for capturing and storing panoramic images using progressive scan (that is, non interlaced) technology. The system includes a digital image input device and an associated control computer. Since the image capture device is digital it can be easily and flexibly controlled by software in the control computer. The image input device has six lenses positioned on the six faces of a cube. While the image input system can have other lens configurations, the use of six lenses in a cubic configuration is optimal for a system that is used to capture a spherical panorama. The six lenses simultaneously focuses different images on six CCDs (Charge Coupled Devices). The image input device also includes an embedded controller, and data compression circuitry. The embedded controller controls the exposure time of the CCDs (i.e. the effective aperture and effective shutter speed) and reads image data from the CCDs. The image data read from the CCDs is compressed, multiplexed, and sent to the control computer. The control computer stores the images in frames, each of which have one image from each of the six lenses. Each frame includes six images that were simultaneously recorded and any associated information, such as audio tracks, textual information, or environmental information such as GPS (Global Position System) data or artificial horizon data. The control computer includes a user interface which allows a user to specify control information such as frame rate, compression ratio, gain, etc. The control computer sends control information to the embedded controller which in turn controls the CCDs and the compression circuitry. The images can be sent from the control computer to a real time viewer so that a user can determine if the correct images are being captured. The images stored at the control computer are later seamed into panoramas and made into panoramic movies.

4 Claims, 13 Drawing Sheets

|    |            |         |         |         |         |         |              |
|----|------------|---------|---------|---------|---------|---------|--------------|
| Fa | Image Data | Audio A | Audio B | Audio C | Audio D | Audio E | Control Info |
| Fb | Image Data | Audio A | Audio B | Audio C | Audio D | Audio E | Control Info |
| Fc | Image Data | Audio A | Audio B | Audio C | Audio D | Audio E | Control Info |
| Fd | Image Data | Audio A | Audio B | Audio C | Audio D | Audio E | Control Info |
| Fe | Image Data | Audio A | Audio B | Audio C | Audio D | Audio E | Control Info |
| Fg | Image Data | Audio A | Audio B | Audio C | Audio D | Audio E | Control Info |
| Fh | Image Data | Audio A | Audio B | Audio C | Audio D | Audio E | Control Info |
| Fi | Image Data | Audio A | Audio B | Audio C | Audio D | Audio E | Control Info |

FIG. 11

SYSTEM FOR DIGITALLY CAPTURING AND RECORDING PANORAMIC MOVIES

RELATED APPLICATIONS

The present invention is a continuation in part of application Ser. No. 09/310,715 which was filed May 12, 1999, and which is now pending and which is a continuation in part of application Ser. No. 60/085,319 which was filed May 13, 1998.

FIELD OF THE INVENTION

The present invention relates to photography and more particularly to a system for digitally capturing and recording panoramic images.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

A panoramic image is an image with a wide field of view. A panoramic image can have a field of view up to an entire sphere, that is 360 degrees in the horizontal dimension and 180 degrees in the vertical dimension.

Panoramic images can be computer generated using mathematical models, or they can be produced by seaming together a number of photographically captured images. The number of images which must be seamed to form a panorama is determined by the field of view of each of the images being seamed. For example a fisheye lens can capture a very wide field of view, and as few as two such images can be seamed to form a spherical panorama.

Computer programs are available which match the edges of images and which join a number of images to form a panorama. For example U.S. Pat. Nos. 5,023,925 and 5,703,604 describe a system for capturing images, seaming the images into panoramas, and for viewing selected portions of the panoramic images. Dodeca L.L.C., located in Portland, Oreg., commercially markets a system for capturing images using a multi lens camera. In the Dodeca system the images are recorded on video tape using the conventional NTSC video standard.

Co-pending patent application Ser. No. 09/310,715, filed May 12, 1999 describes how a series of panoramic images can be made into a panoramic movie which simulates movement through three dimensional space. In order to make a panoramic movie images must be captured, recorded, and seamed. The prior art system for capturing and storing images a series of images suitable for seaming into panoramas, captured and stored the images using the conventional NTSC video format. The analog NTSC format signals were later converted to digital signals.

The NTSC video format utilizes interlaced fields. If images are captured and stored using the interlaced NTSC format, prior to seaming, the interlacing must be eliminated. This can be done utilizing a variety of techniques, for example, if the images were captured at 60 interlaced fields per second, every alternate field can be ignored resulting in 30 non-interlaced digital images per second. Alternatively, each two adjacent interlaced fields can be combined into one non-interlaced digital image. However, irrespective of how the interlacing is eliminated, data is lost or undesirable inter-frame artifacts are introduced into the resulting non-interlaced images.

The present invention eliminates the problems introduced by the NTSC format by capturing and storing the original images utilizing digital progressive frame (that is non-interlaced) technology. Since the present invention initially captures images utilizing digital progressive frame technology, a sequence of panoramas made from images captured and recorded with the present invention can be displayed as a panoramic movie which faithfully represents rapid movement through multidimensional space.

It is known that a cubic representation is a particularly efficient technique for representing a panorama. That is, storing six images that collectively represent an entire spherical panorama is particularly efficient with respect to the amount of memory required to store such a panorama. The present invention provides an image capture device that inherently takes advantage of the storage efficiencies inherent in a cubic representation.

SUMMARY OF THE INVENTION

The present invention provides a very flexible, digital system for capturing and storing panoramic images using progressive scan (that is, non-interlaced) technology. The system includes a digital image input device and an associated control computer. Since the image capture device is digital it can be easily and flexibly controlled by software in the control computer. The image input device has six lenses positioned on the six faces of a cube. While the image input system can have other lens configurations, the use of six lenses in a cubic configuration is optimal for a system that is used to capture a spherical panorama. The six lenses simultaneously focuses different images on six CCDs (Charge Coupled Devices). The image input device also includes an embedded controller, and data compression circuitry. The embedded controller controls the exposure time of the CCDs (i.e. the effective aperture and effective shutter speed) and reads image data from the CCDs. The image data read from the CCDs is compressed, multiplexed, and sent to the control computer. The control computer stores the images in frames, each of which have one image from each of the six lenses. Each frame includes six images that were simultaneously recorded and any associated information, such as audio tracks, textual information, or environmental information such as GPS (Global Position System) data or artificial horizon data. The control computer includes a user interface that allows a user to specify control information such as frame rate, compression ratio, gain, etc. The control computer sends control information to the embedded controller which in turn controls the CCDs and the compression circuitry. The images can be sent from the control computer to a real time viewer so that a user can determine if the correct images are being captured. The images stored at the control computer are later seamed into panoramas and made into panoramic movies.

brief description of figures

FIG. 11 is a diagram illustrating the audio information and other control information associated with each key frame.

DESCRIPTION OF APPENDENCES

Appendix A is printed computer code for retrieving images and correcting the perspective of images in a pan movie.

Appendix B is a sample of a link control file for a pan movie.

Appendix C is computer pseudocode for linking sequences of images to form a pan movie.

DESCRIPTION OF PREFERRED EMBODIMENT

Figure 1A:
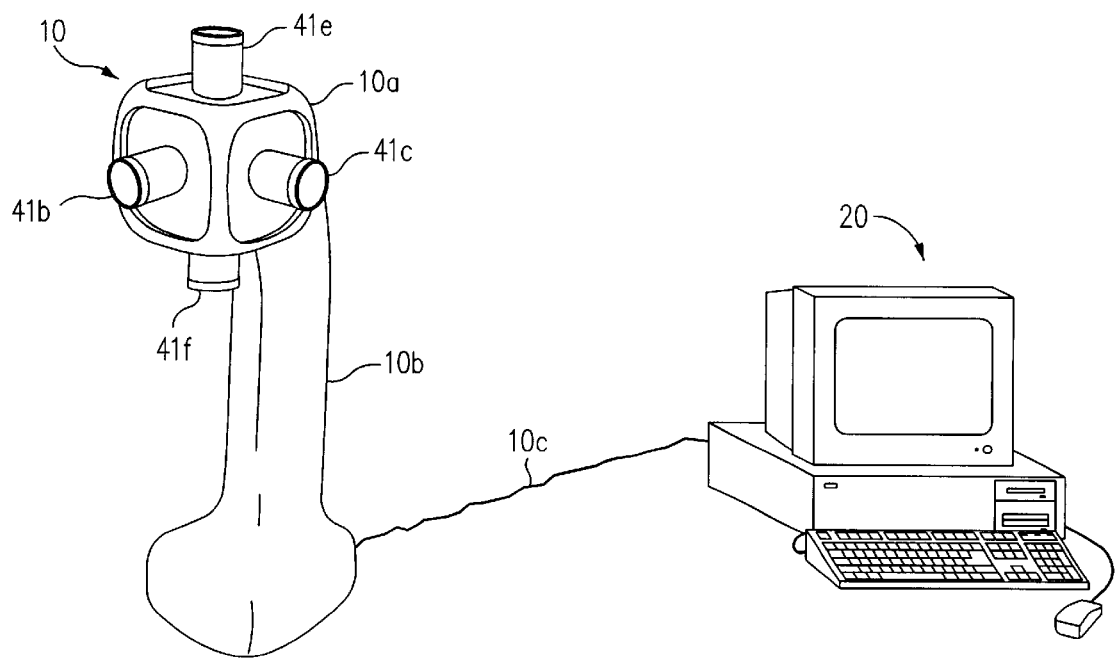
FIG. 1A is an overall diagram of the system including the image input device and the control computer.
Figure 1B:
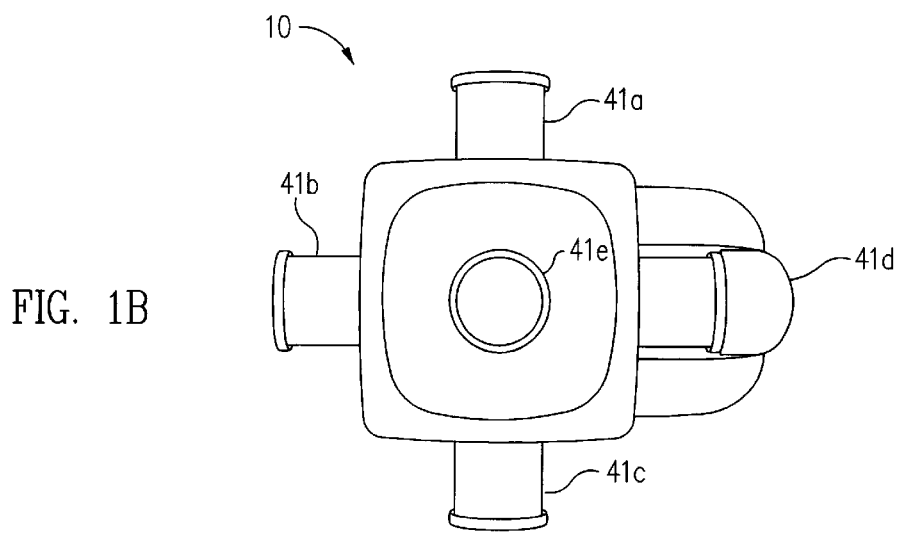
FIG. 1B is a top view of the image input device.

An overall diagram of a preferred embodiment of the invention is shown in FIG. 1. There is a digital image capture device 10 that is connected to a control computer 20 by a cable 10c. Image capture device 10 has six lenses 41a to 41f positioned on the six sides of a cube shaped frame 10a. FIG. 1B is a top view of image capture device 10 which shows some of the lenses 41a to 41f that are not visible in FIG. 1A. The cube 10a is mounted on top of a handle 10b.

Figure 2:
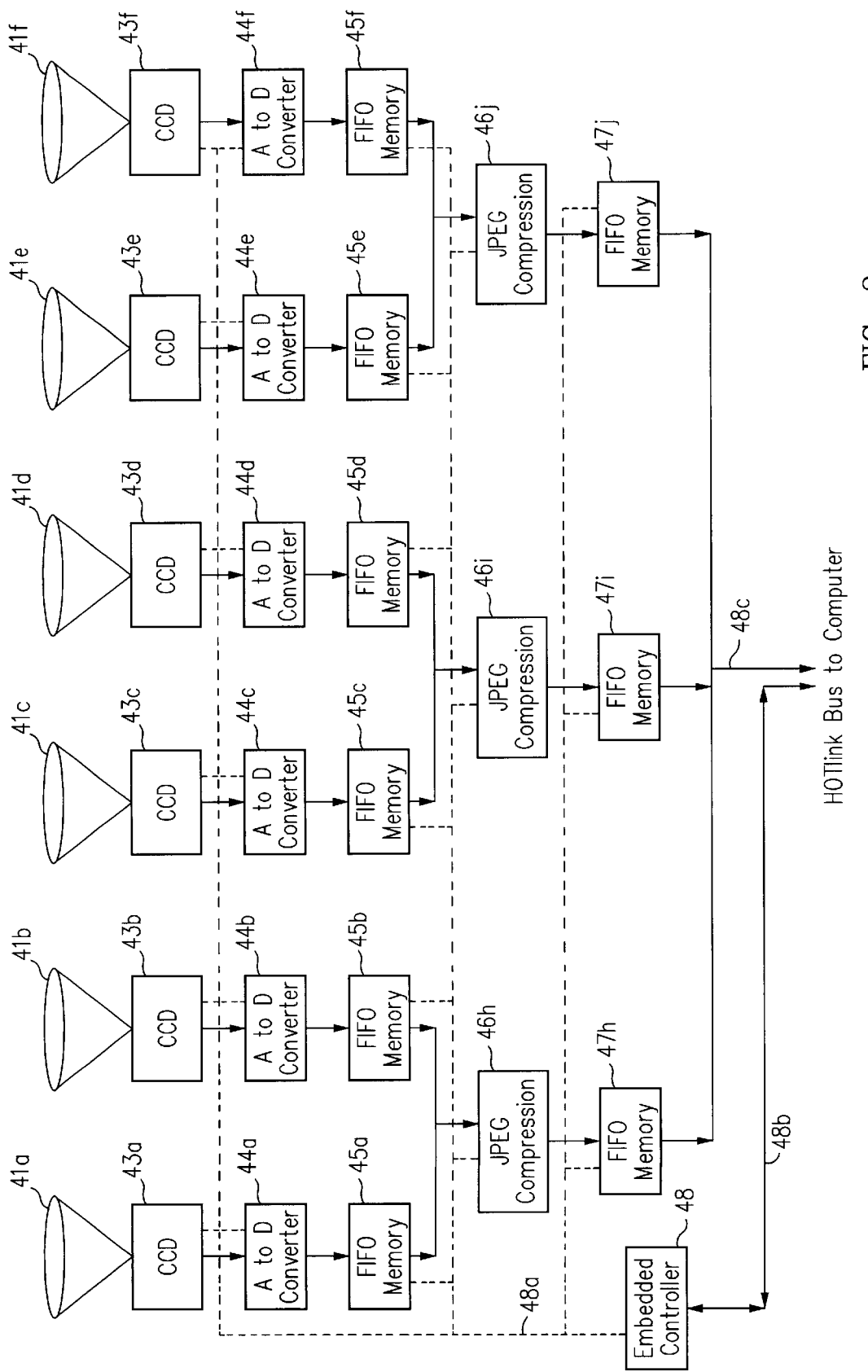
FIG. 2 is an electrical block diagram of the circuitry in the image input device.

A block diagram of the electronic components inside of image capture device 10 is shown in FIG. 2. There are six CCD devices 43a to 43f, one associated with each of the lenses 41a to 41f. Each lens 41 projects an image onto the associated CCD device 43. Each lens 41 has a 135 degree filed of view. Thus, the various images have some overlap to insure that the images can be seamed into a complete panorama without any missing areas. The field of view of the lenses is chosen to provide enough overlap for efficient seaming, without providing so much overlap that storage space is used needlessly.

The output from each CCD 43 goes to an analog to digital converter 44 and then to a FIFO (first in first out) buffer memory device 45. Images captured by the CCD array 43 are in the form of a progressive scan image, that is, there is no interlacing. There is one JPEG compression chip 46 for each two lenses. For example the output of FIFO 45a and FIFO 45b go to compression chip 46h. The output of compression chips 46 go to FIFO buffer memories 47 and then to the computer bus 10c.

The lenses 41 and the CCD arrays 43, are similar to the components found in commercially available digital cameras. JPEG compression chips 44, the A to D converters 44, the FIFO memories 45 and 47, and embedded controller 48 are also commercially available components. For example such components are available from suppliers such as Zoran Corporation or Atmel Corporation An embedded controller 48 controls the operation of the various components shown in FIG. 2. Control lines go from each device in FIG. 2 to embedded controller 48. These control lines are indicated on FIG. 2 by the dotted lines 48a. While for convenience and clarity of illustration only one dotted line 48a is shown in FIG. 2 it should be understood that dotted line 48 represents a control line from controller 48 to each of the components. Furthermore, the lines 48a represent both control and timing signal lines.

In the preferred embodiment the connection from image capture unit 10 and computer 20 (and from computer 20 to real time viewer 30 which will described later) is a "HOTlink" serial bus. Such connections are commercially available from suppliers such Cypress Semiconductor Corp. or from Dataforth Corporation which is a division of Burr-Brow Company. Alternatively other types of high speed connections could be used. For example the connection could be a standard SCSI connection. As shown in more detail in FIG. 2, the connection 10c between image capture unit 10 and control computer 20 has both a HOTlink bus 48c which transfers image data and a conventional serial bus 48b which transfers control information.

The control computer 20 is a conventional type of personal computer with a Windows NT operating system. Microsoft Corporation of Redmond Washington markets the Windows NT operating system. An application program receives input from a user and sends control signals from control computer 20 to the image capture device 10. These signals can be sent on a separate serial bus 48b.

A user can specify the following control items:
1) Frame rate: Frames can be captured at either 15 or 30 frames per second. A higher frame rate shows fast motion better; however, it utilizes more storage space
2) Shutter control: Shutter control can be either automatic or manual. In the automatic mode, the shutter setting can be set by either detecting the light level at all the CCD arrays and finding an average setting or by selecting one CCD array and setting all the others based upon the light at that one lens. The allowed settings are therefore:

Automatic: All sensors averaged

Automatic: front sensor controls

Automatic: right sensor controls

Automatic: left sensor controls

Automatic: back sensor controls

Automatic: top sensor controls

Automatic: bottom sensor controls

Manual: $1/10,000$ second

Manual: $1/4,000$ second

Manual: $1/2,000$ second

Manual: $1/1,000$ second

Manual: $1/500$ second

Manual: $1/250$ second

Manual: $1/125$ second

Manual ⅟₆₀ second

Manual ⅟₃₀ second

3) Gain level: If desired the input signal can be amplified to increase the contrast in the image. The allowed settings are Normal and Booster.

4) Compression ratio: The compression chips 46 can apply a varying amount of compression to the signals. Lower compression results in better quality images; however, it requires more storage space. The allowable settings are Minimum, Low, Medium, High and Maximum.

Figure 3A:
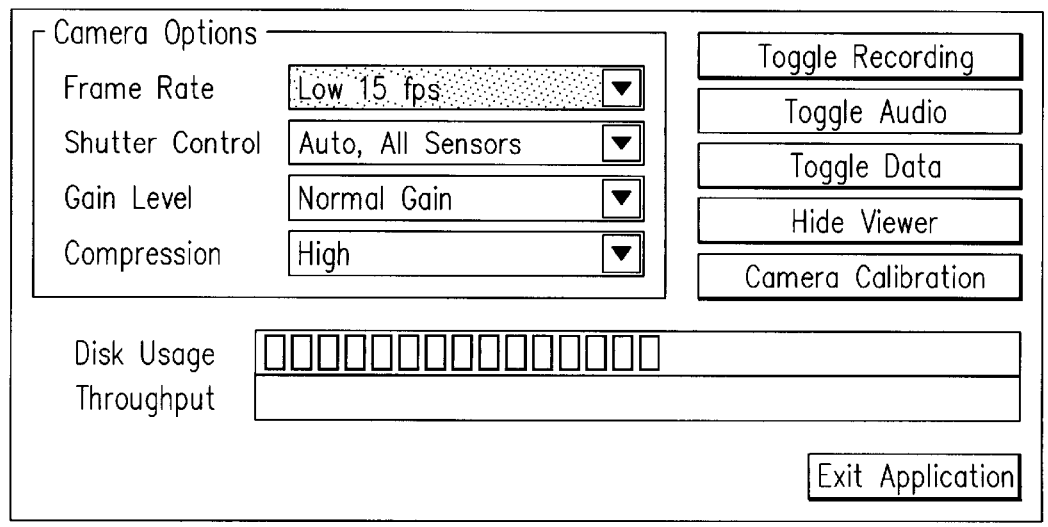
FIG. 3A is a diagram of a screen display showing how a user enters control data

FIG. 3A shows the screen that is presented to a user on computer 20 to allow the user to set the various parameters. Each parameter has a drop down menu that allows the user to select the appropriate settings. Such drop down menus are conventional. On the right hand side of the screen shown in FIG. 3A are a number of additional "buttons" that allow the operator to control the operation of the system. On the bottom of the display are bars that give an indication of how much disk space has been used and the rate of throughput of the system. Such bars are conventional.

Figure 3B:
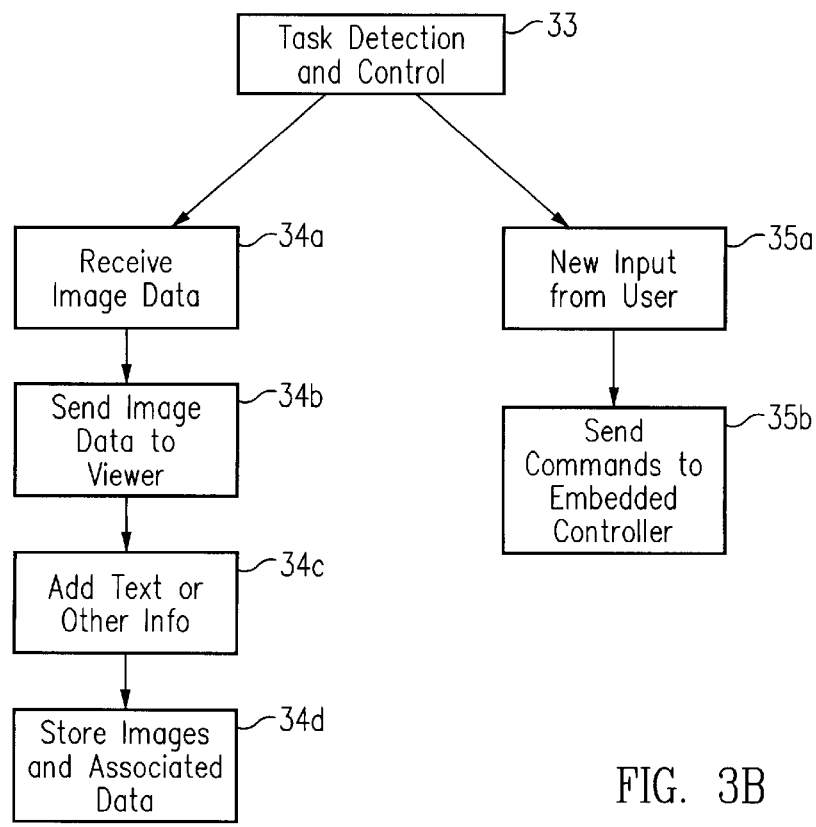
FIG. 3B is a program flow diagram of the operations performed by the control computer.

FIG. 3B shows a block diagram of the program in computer 20. There are several independent tasks operating on a multi tasking basis. The two tasks relevant to the present invention are shown in FIG. 3B. Others can also be operating. A task detection and control is indicated by block 33.

When data is being received from the image input device 10 (as indicated by block 34*a*) the data can be sent to a real time viewer as indicated, by block 34*b*, other data such as text, audio, GPS (Global Positioning System) data, or control information can be added to the images as indicated by block 34C and the images and associated data are stored as indicated by block 34*d*. Text data would merely be words or figures that is displayed when the associated image is viewed. Audio and control information are described later. GPS data is data showing the location where and image was captured. Such data can be automatically acquired from commercially available GPS devices.

The system also periodically checks for new user input as indicated by block 35*a*. When new input is received, appropriate commands are generated and sent to embedded controller 48 over a serial bus 48*b*. The structure of the commands and the transfer of command information between computer 20 and controller 48 are conventional.

In order to simulate movement through multi-dimensional space, one must first capture a series of panoramic images, the panoramic images must be stored as frames and then the appropriate view window from selected frames must be displayed in an appropriate sequence.

Figure 4A:
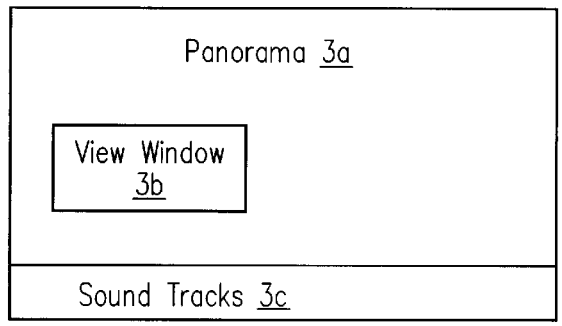
FIG. 4A illustrates a key frame (that is, panoramic image) with a view window and associated sound tracks.

A panoramic image provides data concerning what is visible in any direction from a particular point in space. At any particular time a viewer or user can only look in one direction. The direction or point of view of a viewer or user determines the "view window", that is, the part of a panoramic image which is projected on a screen at a particular time. FIG. 4A shows a key frame (i.e. a panoramic image) or a panorama 3*a*. Panorama 3*a* has a view window 3*b* that corresponds to a portion of panorama 3*a*. Panorama 3*a* also has associated therewith a number of sound tracks 3*c*. It is noted that for ease and clarity of illustration, no attempt has been made to illustrate in FIG. 4A the well know fact that there is a difference in perspective between what is displayed in a view window and what is stored in a flat section of a rectilinear spherical panorama.

Figure 4B:
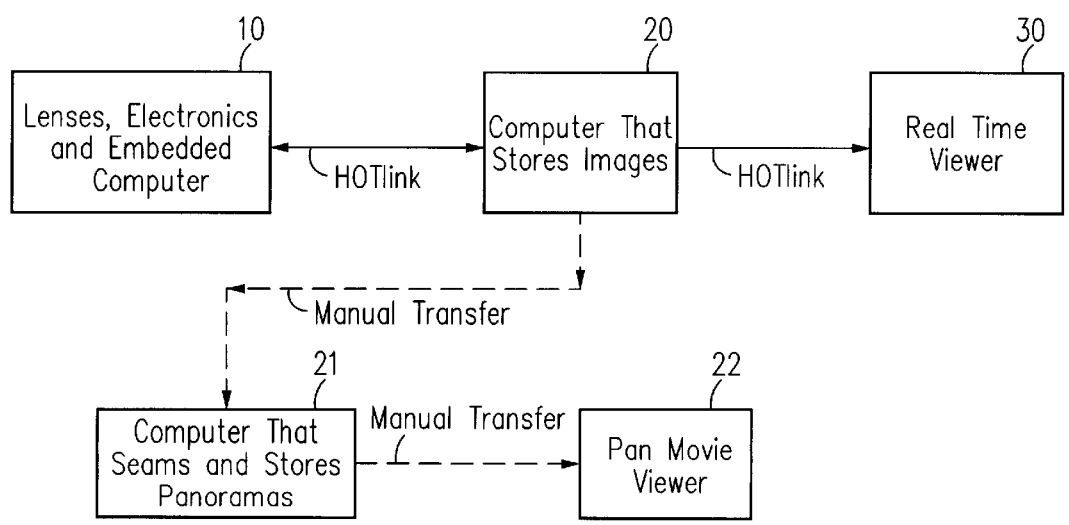
FIG. 4B is a block diagram showing the major components in the preferred embodiment.

FIG. 4B is an overall diagram of a system that utilizes the preferred embodiment of the invention. An image capture unit 10 captures images. The images are sent to a computer 20 which stores the images. Computer 20 also controls image capture unit 10. If desired the images can be viewed by a real time viewer 30. The images are transferred from computer 20 to off line computer 21. Computer 21 seams the images into panoramas, transforms the images to equirectangular format, adds other information to the images, compresses the panoramas, and links the panoramas into a pan movie. Finally the pan movie is viewed on viewer 22.

Figure 5A:
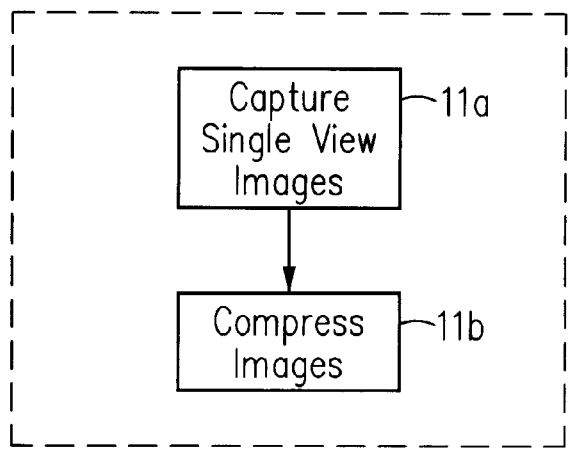
FIGS. 5A to 5E show the sequence of operations performed by the various components in the system shown in FIG. 4B.
Figure 5B:
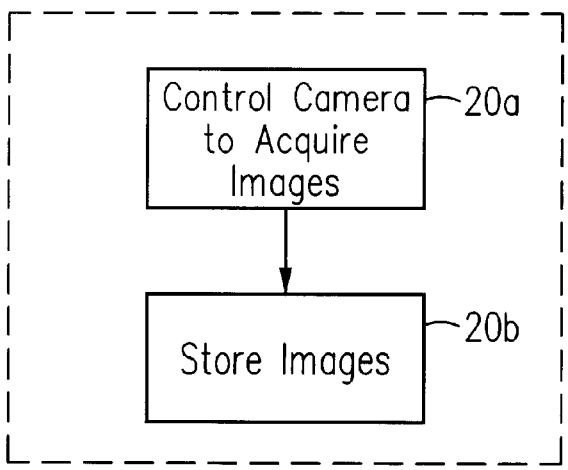

The operations performed by the units in FIG. 4B are shown in FIGS. 5A, 5B, 5C, 5D, and 5E. As shown in FIG. 5A, block 11*a*, camera unit 10 captures a number of single view images. As indicated by block 11*b* these images are compressed and sent to a computer 20. Computer 20 activates image capture unit 10 as previously explained to capture the images as indicated by block 20*a*. It then accepts the images as indicated by block 20*b* and stores them.

Figure 5C:
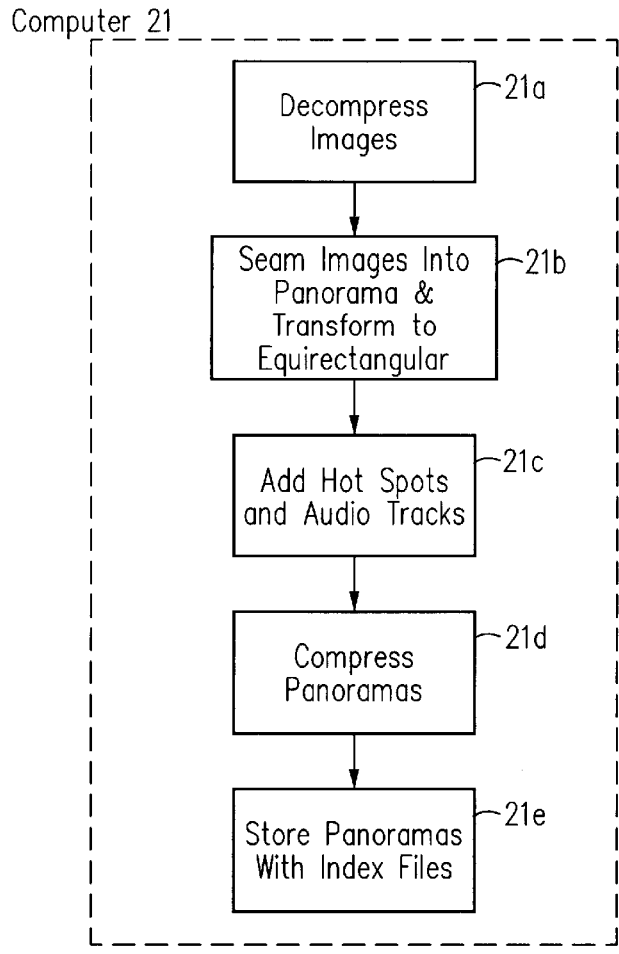
Figure 5D:
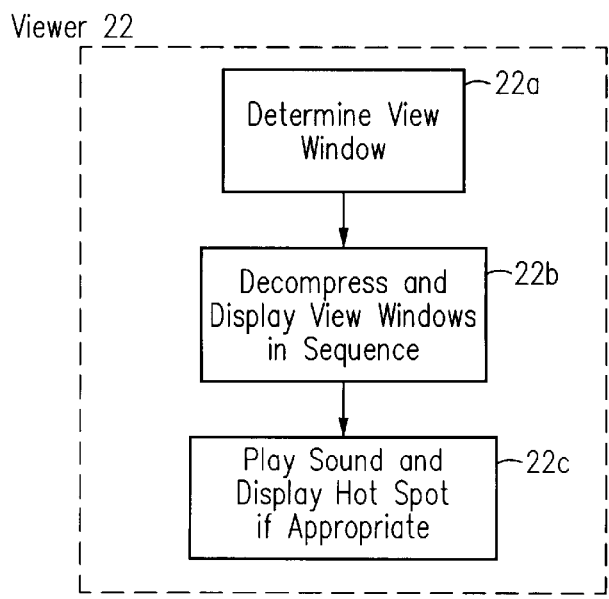

The stored images are manually transferred to off line computer 21 which is programmed to perform the operations shown in FIG. 5C. First the images are decompresses as indicated by block 20*a* so that they can be manipulated. Next the single view images are seamed into a panorama and transformed to equirectangular format as indicated by block 21*b*. The six images received (for example each 1/30th of a second if the image capture unit is operating at 30 frames per second rate) are seamed and transformed to equirectangular format to form one panorama as indicated by step 21*b* in FIG. 5C.

Hot spots which indicate break points in a sequence of images and sound tracks are added next as indicated by block 21*c*. Finally the images are compressed as indicated by block 21d and stored with an index file as indicated by block 21*e*. Each panorama is termed a "key frame". A series of key frames displayed in sequence is a pan movie. When a pan movie is being displayed, at any particular time a viewer can only observe what is in the view window of each frame.

A viewer program in viewer computer 22 is used to view the pan movies. The viewer 22 displays in sequence a series of images, that is, a series of key frames. For each key frame displayed the viewer 22 determines an appropriate view window as indicated by block 22*a*. The portion of the key frame that corresponds to the view window is then de-compressed and displayed as indicated by block 22*b*. As indicated by block 22*c*, sound is played and hot spots are displayed, if appropriate.

Figure 5E:
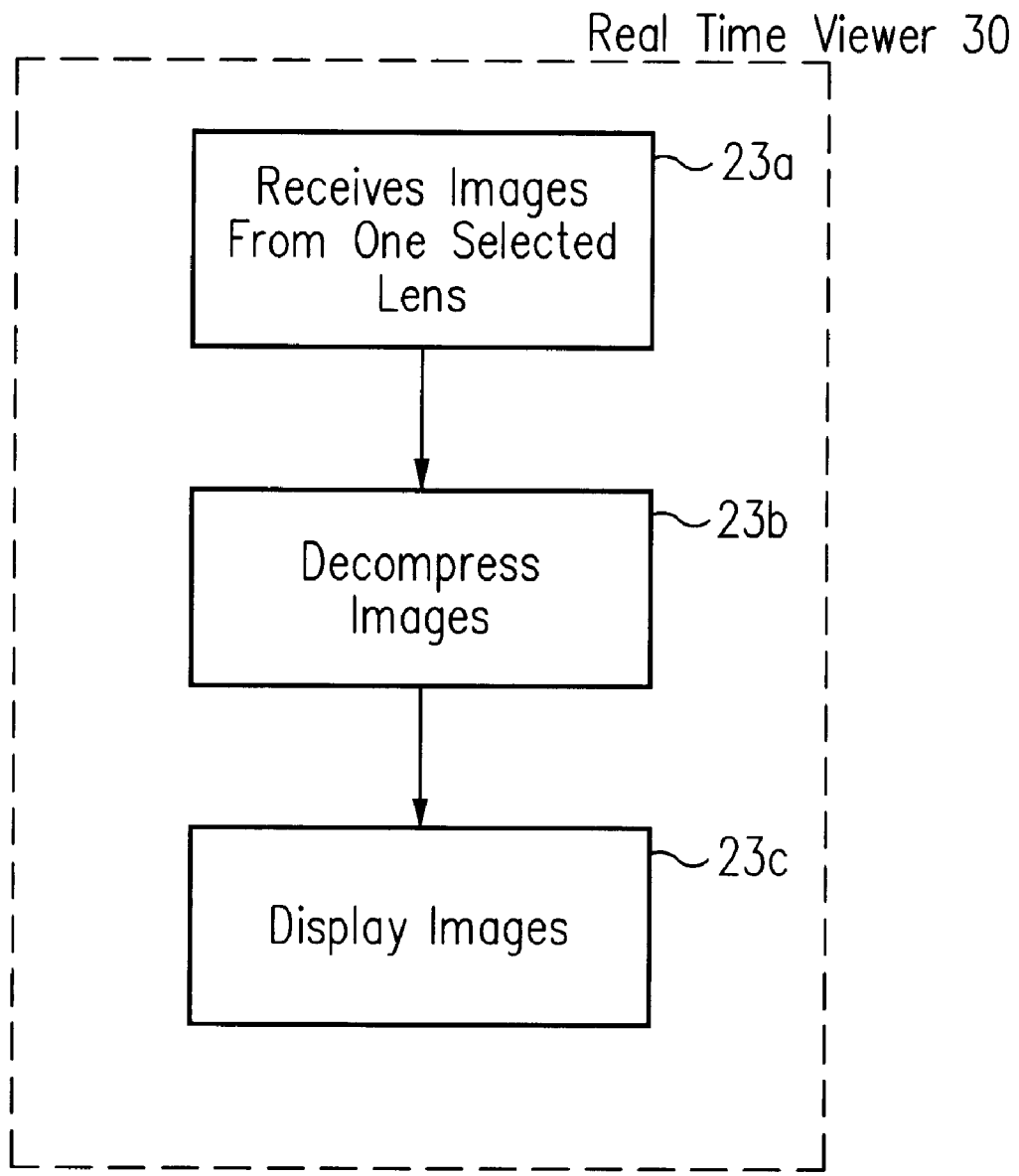

If desired, images can be sent to real time viewer 30 as they are being acquired. The steps performed by real time viewer 30 are shown in FIG. 5E. After the images are received as indicated by block 23*a*, they are decompressed as indicated by block 23*b*. Finally as indicated by block 23*c* the images are displayed.

It is noted that the operations indicated by blocks 20*a*, 20*b*, 21*a* to 21*e*, 22*a*, 22*b*, and 22*c* are implemented by means of computer programs which perform the functions shown. Computer programs are given in appendices A, B, C, and D.

Figure 6A:
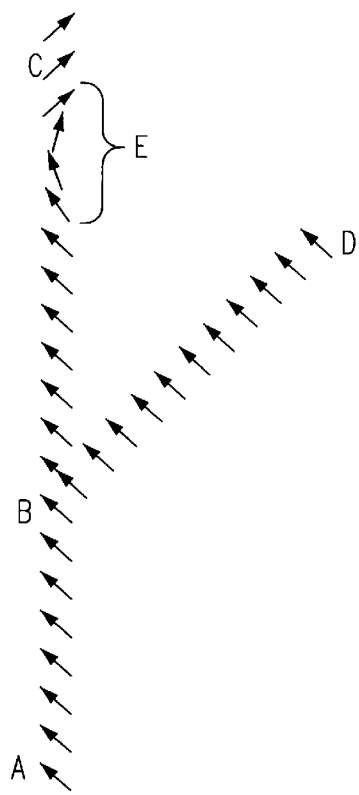
FIG. 6A illustrates a sequence of frames that constitute a panoramic movie.

FIG. 6A represents or illustrates a sequence or series of panoramic images in a pan movie. Each arrow in FIG. 6 represents one key frame. At any particular time, only a part (i.e. the view window) from one key frame is visible to a user or observer. The direction of each arrow indicates the direction of view, that is, the view window or part of the key frame that is projected on a screen for observation. The arrows in FIG. 6A are meant to represent a particular "view window" from each key frame. As indicated by the change in direction of the arrows in the area of FIG. 6A designated by the letter E, a viewer can change his direction of view as the pan movie progresses. It is noted that when a user is viewing a panorama, a user can point toward the top or bottom of the screen and thus can view images located in a 360 degree circle from top to bottom in addition to the horizontal directions illustrated by the arrows shown in FIG. 4A.

The sequence of images begins at the point or at the key frame indicated by the letter A and the sequence proceeds to the point or key frame indicated by the letter B. At this point the viewer can select to either go toward point C or toward point D. The selection may be made by "clicking" on a designated "hot spot" in the panorama designated B or it may be made depending on some other criteria or action by the user. An important point is that at the branch point B, the direction of view (indicated by the direction of the arrows) remains the same irrespective of which path of travel is chosen. The view from the first frame after the branch point will be almost identical in both paths. As time progresses and the viewer moves further from the branch point, the view will gradually change. This is the effect that a person experiences when one arrives at a dividing point in a path. When a person takes the first step on a branching path, the person's field of view remains practically identical.

It is noted that at branch point B, the arrows are not pointing in the direction of the path leading to point D. Normally, a viewer would be looking in the direction of a branch point when the viewer selects to travel in the direction of the branch point. Thus, a viewer looking in the direction of the arrows shown in FIG. 6A would normally continue to point C rather than selecting the path to point D.

Sequences of key frames can either be joined at branch points such as branch point B or alternatively a branch point may be located at the end of a sequence of key frames. That is, a branch point may be located at the terminal frame of a sequence of key frames. Such a branch point could have two alternative sequences, one of which can be selected by a user by clicking on one of two hot spots. Alternatively at the end of a sequence of key frames, there can be an implicit branch point. At such an implicit branch point a new sequence of frames would be selected by the system without any action by the user.

There is a one to one ratio of key frames to possible user positions. Hence, there exists a correlation between frame rate and user motion speed. If the user is moving through the environment, every frame displayed is a new key frame. The faster the frame rate for a given frame spacing, the faster the user travels. Given a fixed frame rate, the user's travel speed may be dictated by the relative spacing of key frames. The closer the key frames are, the slower the user will travel. For example, for a travel speed of approximately 5 mph and a playback frame rate of 15 fps, individual panoramic frames should be captured at about 6 inch increments. The math is as follows: (5 miles/hour * 63,360 inches/mile)/ (3600 sec/hour * 15 frames/sec)=6 inches per frame. When the movie is being displayed, speed of travel can be increased by skipping some of the frames (for example if every other frame is skipped the speed of travel is doubled). Skipping frames reduces the rate at which frames need be sent to the viewer and thus reduces the bandwidth required.

In addition to the spacing of key frames to achieve different travel speeds, the orientation of individual key frames may be adjusted in order to achieve a desired motion effect, such as gate, slumber, waddle, crawl, skip, etc. The orientation of a key frame is defined to be the default view (or point of focus) of the user within the panoramic image if no other point of view is specifically selected.

Figure 6B:
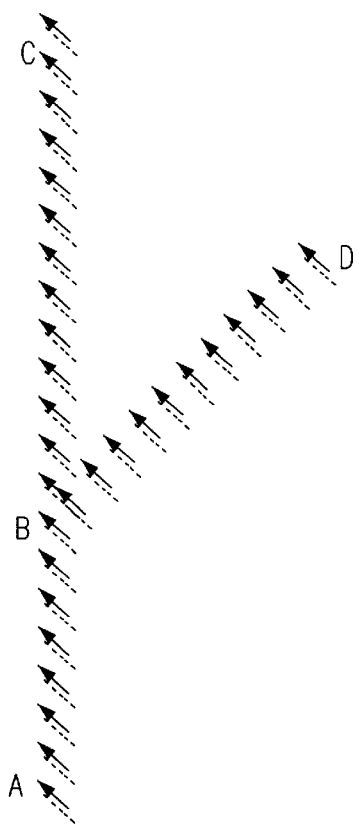
FIG. 6B illustrates the sound track associated with the frames of a panoramic movie.

Sound can accompany the visual effect provided by pan movies. FIG. 6B indicates that each key frame can have one or more associated digital sound tracks. The digital sound tracks are indicated in FIG. 6B by the dotted line which is associated with each of the arrows. As shown in FIG. 11 and described later, there can be several different sound tracks associated with each key frame.

The seaming operation indicated by block 21b is done by the program in computer 21. In general the seaming operation connects the individual images into a panoramic image by finding the best possible fit between the various individual images. The process of seaming images into a panoramic image is known. For example U.S. Pat. Ser. No. 5,694,531 describes seaming polygons into a panorama which has a low root-mean-square error. A computer program which can seam the six images from lenses 41a to 41f of camera 20 into a panorama is given in Appendix D.

After the seaming operation is complete each seamed image is a panoramic image (called a panorama) and each panorama is a frame of a pan movie. Prior to storage the seamed images are compressed so as that the file size will be manageable. A commercially available compression program known as "Indeo" is used to compress the images. The Indeo program was developed by and is marketed by the Intel Corporation. The Indeo compression program provides a mode of operation which does not utilize any inter-frame compression. The no inter-frame compression mode of the Indeo program is used with the present embodiment of the invention. Since there is no inter frame compression, the key frames can be accessed and viewed in either the forward or the reverse direction. Furthermore, only the portion of a panorama required for a particular view window is decompressed, thereby saving time and computational resources.

Figure 7:
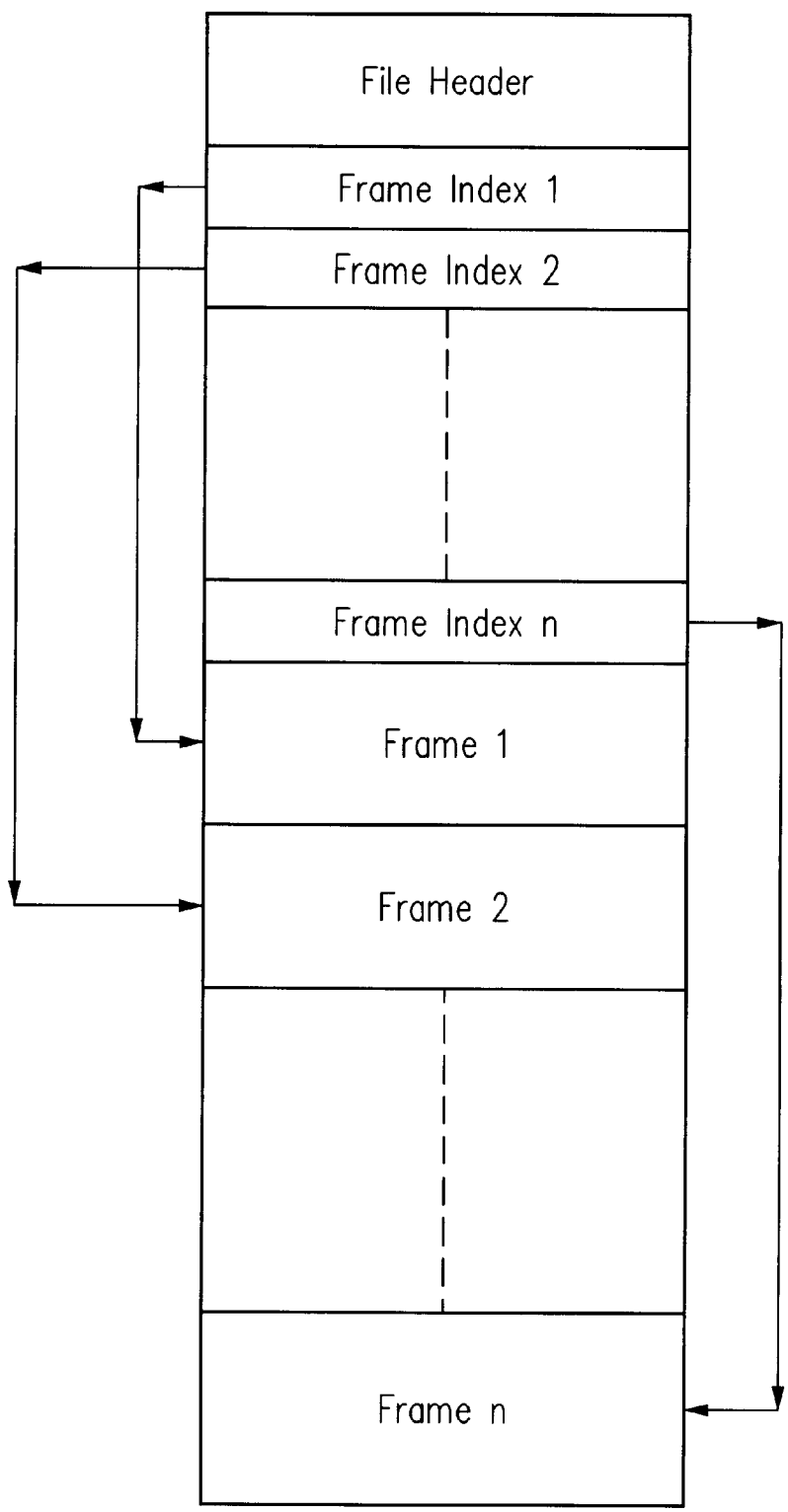
FIG. 7 is a diagram of a file containing a pan movie which consists of a series of panoramas stored as a series of compressed key-frames and a file index for sequencing playback of the key-frames.

The compressed panoramic images are stored in files on computer disks, tape or compact discs (CDs). Each file includes a header and an index as shown in FIG. 7. The header includes information such as the following:

File Type Tag:

File Size: (total bytes used by the file)

Index Size: (Number of entries in frame Index)

Max Frame Size: (total bytes used by largest compressed frame)

Codec: (Codec used to compress frames.

After the file header, a frame index is provided (see FIG. 7). Each frame index points to the location of the associated frame as indicated by the arrows in FIG. 7. Thus, individual frames can be read in any order by obtaining their location from the frame index.

The indexing mechanism would not be necessary if the key frames were always going to be used in frame order. However, in the present embodiment, the system can play the key frames which comprise the pan movie in either forward or backward direction. Hence the system must be able to locate individual frames quickly in any order. Furthermore, it is desirable that the system be able to locate a key frame with only a single disk access. Consider the situation were the user is moving "backward" (in the opposite direction of the key frame disk storage) at a fast travel speed (to increase speed of movement some key-frames are skipped). Without a key frame directory, the disk would have to be searched in a "reverse-linear" manner in order to find and load the next appropriate key frame. With a key frame directory, the next key frame location is located immediately, and loaded with a single disk access (given the directory itself is stored in RAM memory).

As indicated in FIG. 4A, a viewer can branch from one sequence of images to another sequence of images. This is indicated by branch point B in FIG. 4A. By branching a user in effect changes the direction of the simulated travel. A user indicates a desire to change direction by "clicking" on a visible "hot spot" or by otherwise activating a hidden hot spot. A visible hot spot can be indicated by any type of visible symbol that is visible in a view window. For example a hot spot may be indicated by a bright red dot in the view window. Alternatively, a hot spot may be indicated by the fact that the cursor changes to a different shape when the cursor is over a hot spot.

It is noted that not all visually apparent alternate paths visible in any panorama are actually available as a pan movie branch. For example, at a street intersection, branches may not be provided to all visible streets. Care must be taken to insure that a viewer is given an indication of the branch points that are actually available to the viewer.

At a playback rate of 30 frames per second a user would have to be very "fast" (i.e. it would in fact be practically impossible) for a viewer to see and click on a hot spot that appears on a single frame. Without advanced notice, the viewer would have great difficulty actually taking a specific action to activate a branch during a specific single frame since in normal operation a particular frame is only displayed for about 1/30th of a second. In order to be effective and user friendly a user must be given an early indication of an upcoming branch opportunity that requires user action. A hot spot in a pan movie must be visible by a viewer in a relatively large number of key frames. For example a hot spot might be visible in the thirty key frames that precede (or follow for reverse operation) a branch point.

Figure 8:
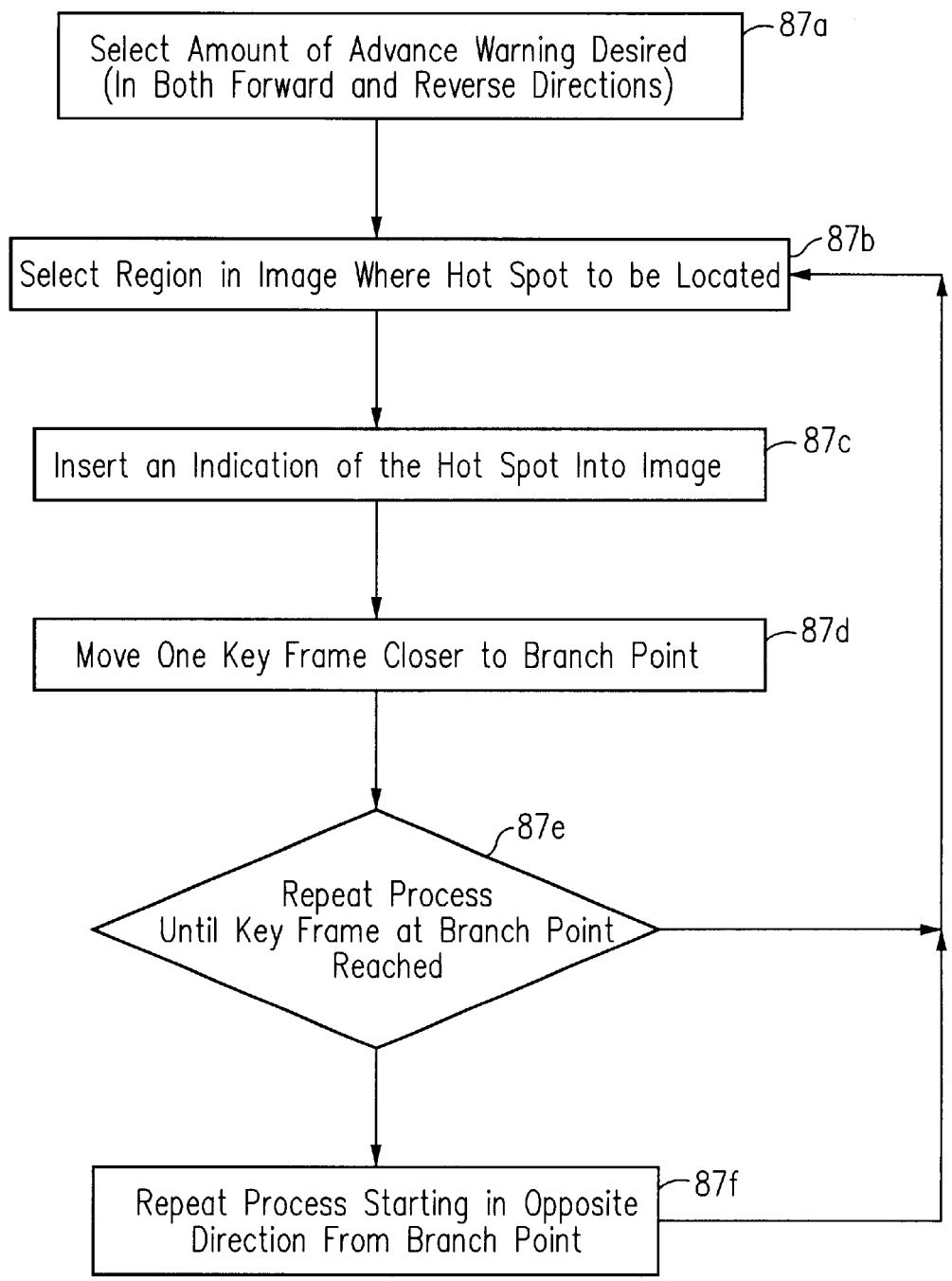
FIG. 8 is a block diagram of a program for inserting hot spots in a pan movie.

Hot spots are inserted into a pan movie in the manner illustrated in FIG. 8. The hot spots are inserted into the key frames by computer 21 before the frames are compressed as indicated by blocks 21c and 21d in FIG. 5C. It is noted that hot spots may be inserted into a pan movie by altering the original panoramic image so that it includes the hot spot or alternately by providing an overlay image which contains the hot spot image. If an overlay is used, the overlay image needs be projected at the same time as the original image. As indicated by block 87a one must first determine how much in advance one wants to warn the user. If a hot spot is to have a particular size at the time action is needed, when viewed in advance (i.e. from a distance) the hot spot will be much smaller. As indicated by block 87b, in order to insert hot spots in a pan movie, one must select the region where the hot spot is to be located. In general this will be in a view looking toward the direction where the branch will take place. The hot spot is then inserted into the panorama by modifying the images.

A hot spot may be indicated by a light colored outline superimposed over the region. The area within the outline may be slightly darkened or lightened. The object is to highlight the region without obscuring the image itself. Various other alternative indications can also be used.

If for example a hot spot will be visible in 30 frames, it can be inserted in each frame. Starting with a small size spot in the first of the 30 frames and ending with the largest size spot in the 30th frame. Alternatively interpolation can be used. The hot spot of the correct size is designed for the first, middle and last of the 30 frames and interpolation is used in the intervening frames.

The process repeats as indicated by blocks 87d and 87e until the key frame at the branch point is reached. Finally the process is repeated from the opposite direction from the branch point so that the branch point will be visible if the pan movie is shown in the reverse direction.

The changes to the individual key frames may be made manually with a conventional image editor, or the process can be automated by a program designed just for this purpose In order to avoid unnecessary user intervention, "hidden" hot spots may be added to connect multiple pan movies. A hidden hotspot is one that does not need to be manually selected by the user. With a hidden hot spot, if the user "travels" into a particular key frame which has a hidden hot spot, and the user is "looking" in the hot spot's general direction, then the system will react based upon the user's implicit selection of the hotspot and the user will be sent along the path directed by the hot spot.

Figure 9A:
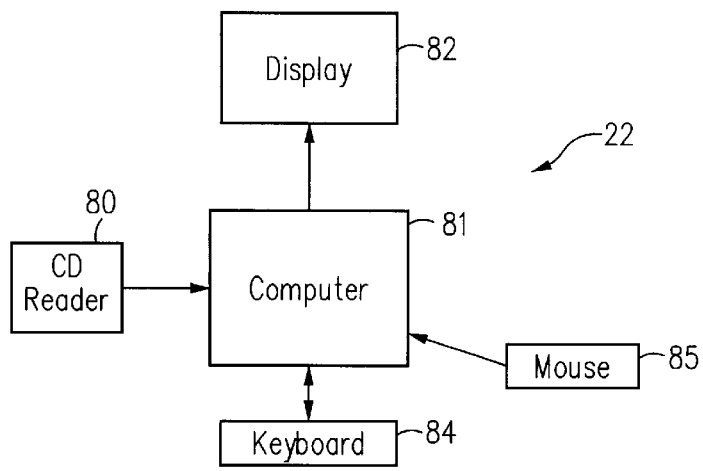
FIG. 9A is a block diagram of a system for playback of a 3-D panoramic movie.

FIG. 9A is a block diagram of the viewer 22 which plays or displays pan movies. The main components of the viewer 22 are a CD disk reader 80, a computer 81, a display 82, a keyboard 84 and a mouse 85. Computer 81 reads key frames from disk 80 and displays the view widow from each key frame on display 82. The operator or user utilizes mouse 85 to indicate a view direction. The view direction determines the view window which is displayed on display 82 by computer 81. A program which implements blocks 22a to 22c (shown in 7 FIG. 3D) is stored in and executed by computer 81.

Figure 9B:
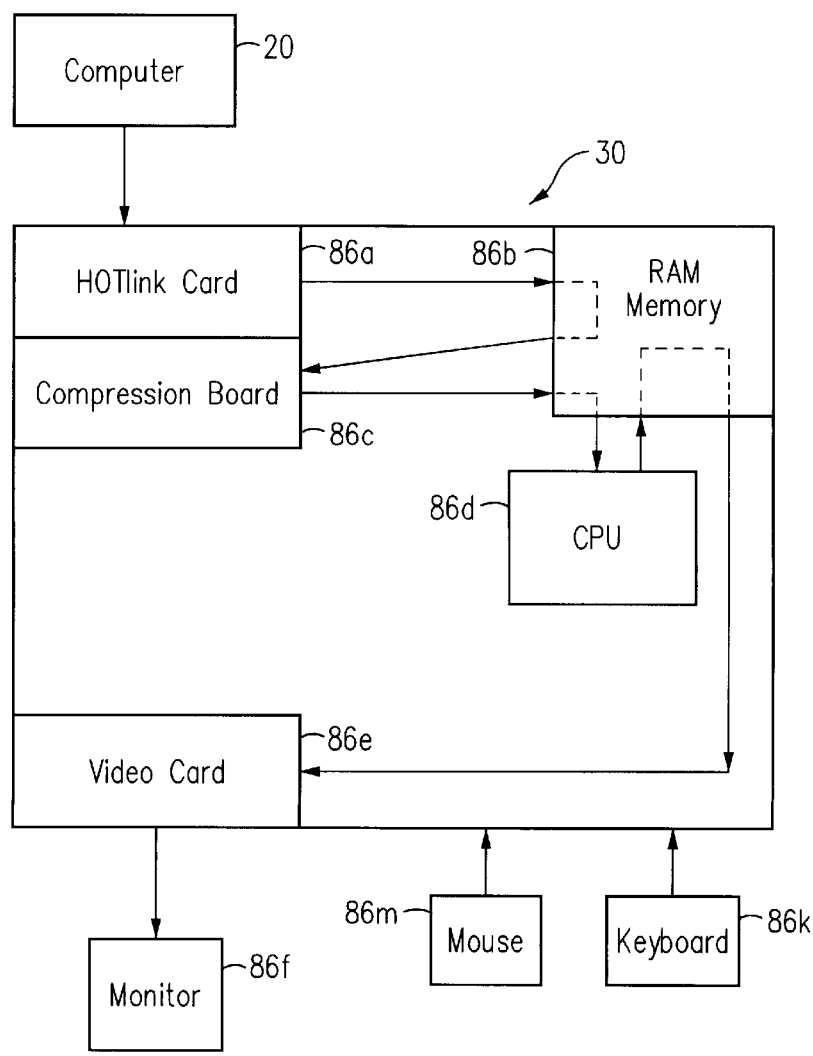
FIG. 9B is a block diagram of a real time viewing unit.

FIG. 9B is a block diagram of the real time viewer 30. As an option, the images captured by camera 10 can be viewed in real time. Images are transferred from computer 21 to viewer 22 in real time. The transfer is by means of a HOTlink bus to HOTlink card 86a. The images go from card 86a to RAM memory 86b and then to decompression card 86c which does the de-compression. From the de-compression board 86c the images go back to memory and then to CPU 86d which combines i.e. seams the images as necessary and transfers them to video card 86e which displays them on monitor 86f. Viewer 30 is controlled via a conventional mouse 86m and keyboard 86k.

Figure 10:
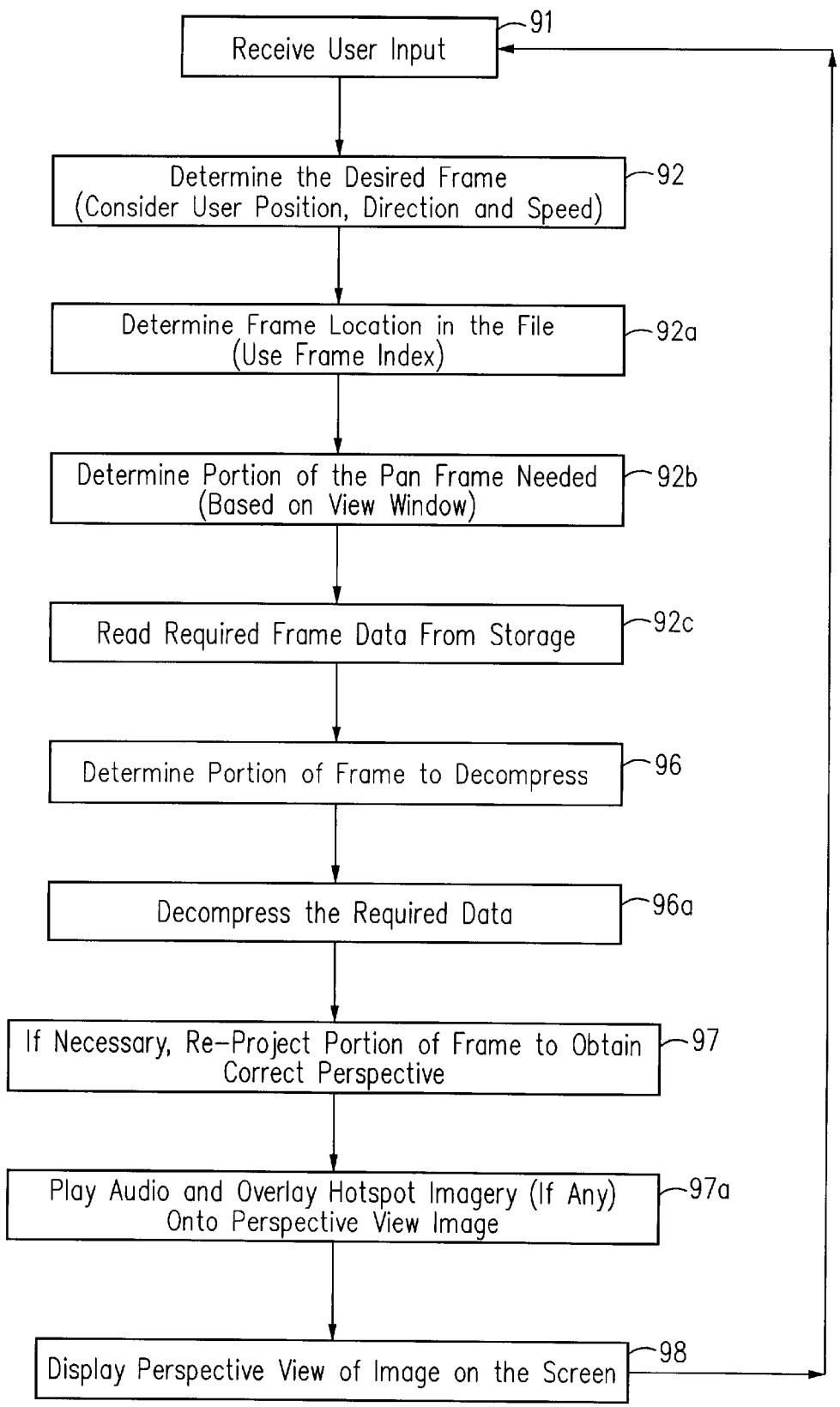
FIG. 10 is a flowchart of the program for viewing a 3-D movie containing a sequence of panoramas according to the invention.

FIG. 10 is block diagram of a program for displaying pan movies. The program shown in block diagram in FIG. 10 is executed by the computer 81 in FIG. 9A. The process begins at block 91 with user input. The user must indicate a start location (at the beginning of the process this would normally be the first frame in the movie). The user must also specify direction of motion, speed and direction of view. As indicated by blocks 92, 92a, 92b and 92c the system determines and then reads the appropriate pan frame data. As indicated by block 96 and 96a, the system determines the portion of the pan frame that is in the selected view window and that portion of the frame is decompressed. As indicated by blocks 97 and 97a, the image is re-projected to obtain a perspective view. If the hot spots have not been placed on the actual key frames but are contained in a separate file, the hot spot imagery is overlaid on the image. Finally, as indicated by block 98, the part of the image which constitutes the view window is projected on the screen.

As a user travels, the next required key frame is determined by the current user position and direction of travel. The location of this key frame within the file of images is determined via the file index directory. The key frames are loaded into RAM memory, decompressed, and displayed in sequence. To increase performance, only the view window (depending on current user view) portions of the key frame need be loaded into RAM. If for ease of programming the entire key frame is loaded into memory, only view window portions of the key frame need be decompressed. If the entire key frame is compressed as a whole, then a de-compressor supporting "local decompression" is more efficient, e.g., Intel Indeo. To determine the portion of the panorama needed to display a particular view, each of the corner coordinates of the perspective view plane (display window) is converted to panorama coordinates. The resulting panorama coordinates do not necessarily represent a rectangle, therefore the bounding rectangle of these panorama data is needed to derive a perspective view at a given view orientation.

Once the corners of the desired bounding rectangle are determined the Indeo de compression program is instructed to decompress only that portion of the key frame needed for the particular view window. In order to do this, the program must call the Video For Windows function ICSetState prior to decompressing the frame. The C code to accomplish this follows.

include "windows.h"
include "vfw.h"
include "vfw_spec.h"

```
extern   HIC              hic;            // Opened CODEC (IV41);
extern   RECT             *viewRect;      // Determined elsewhere
static   R4_DEC_FRAME_DATA StateInfo;
void     SetRectState
(
         HIC              hic;            // Opened CODEC (IV41);
         RECT             *viewRect;      // Local Rectangle of interest
)
{
         R4_DEC_FRAME_DATA StateInfo;
``` memset(&StateInfo,0,sizeof(R4_DEC_FRAME_DATA));

StateInfo.dwSize=sizeof(R4_DEC_FRAME_DATA);

StateInfo.dwFourCC=mmioStringToFOURCC("IV41", 0);// Intel Video 4.1

StateInfo.dwVersion=SPECIFIC_INTERFACE_VERSION;

StateInfo.mtType=MT_DECODE_FRAME_VALUE;

StateInfo.oeEnvironment=OE_32;

StateInfo.dwFlags=DECFRAME_VALID|DECFRAME_DECODE_RECT;

StateInfo.rDecodeRect.dwX=min(viewRect->left, viewRect->right);

StateInfo.rDecodeRect.dwY=min(viewRect->top, viewRect->bottom);

StateInfo.rDecodeRect.dwWidth=abs((viewRect->right-viewRect->left)+1);

StateInfo.rDecodeRect.dwHeight=abs((viewRect->bottom-viewRect->top)+1);

ICSetState(hic,&StateInfo,sizeof(R4_DEC_FRAME_DATA));

}

If the projection used to store the pan-frame is such that there exists a discontinuity in pixels with respect to the spherical coordinates they represent, then the local region required may be the combination of multiple continuous regions. For a full cylinder/sphere equirectangular projection (centered about 0 degrees), the left pixel edge represents −180 degrees and the right pixel edge represents 180 degrees. In spherical coordinates, −180 degrees is the same as 180 degrees. Therefore, the discontinuous left/right pixels represent a continuous "wrap-around" in spherical coordinates.

The math to determine the portion of the source keyframe panorama needed for a particular view window depends on the projection used to store the panorama. Optionally, the viewer may predict the next key-frame to be loaded (depending on user travel direction and speed), and pre-load it in order to increase performance. For an equirectangular projection of a full sphere panorama frame, the equations for determining the required portion are as follows: where:

Scalar variables are lower case, vectors are bold lower case, and matrices are bold uppercase.

Panorama point (s,t) is derived from any perspective plane point (u.v).

The perspective plane has a focal length I from the center of projection.

In addition, the perspective plane can be arbitrarily rotated through a given view orientation, namely heading, pitch, and bank (h,p,b).

Any point in the perspective plane is specified by the 3D vector:

$$w=<u,v,l>$$

The rotations are applied by using a standard matrix-vector product. The three matrices accounting for Heading, Pitch and Bank are as follows:

$$H = \begin{vmatrix} \cos(h) & 0 & \sin(h) \\ 0 & 1 & 0 \\ -\sin(h) & 0 & \cos(h) \end{vmatrix}$$

$$P = \begin{vmatrix} 1 & 0 & 0 \\ 0 & \cos(p) & -\sin(p) \\ 0 & \sin(p) & \cos(p) \end{vmatrix}$$

$$B = \begin{vmatrix} \cos(b) & \sin(b) & 0 \\ -\sin(b) & \cos(b) & 0 \\ 0 & 0 & 1 \end{vmatrix}$$

The vector w is rotated using the above matrices to attain w' like such"

$$w'=H*P*B*w$$

The final step is converting from rectangular to spherical coordinates. Denoting the 3 components of the vector w' as x, y, z, then the conversion is:

$$s=\text{atan2}(x, z)$$

$$t=\text{atan2}(y, \text{sqrt}(x*x+z*z))$$

Note: atan2(a, b) is a standard C-function very similar to atan(a/b), but atan2 correctly handles the different cases that arise if a or b is negative or if b is 0.

Optionally, the viewer may predict the next key-frame to be loaded (depending on user travel direction and speed), and pre-load this key frame in order to increase performance.

Due to the one to one ratio of key frames to possible user positions, there exists an exact correlation between frame rate and user motion speed. If the user is currently moving through the environment, every frame displayed is a new key frame, thus the faster the frame rate, the faster the user travels. For this reason, the frame rate is "capped" during user travel to eliminate the problem of excessive user travel speed. In order to retain smooth motion, the frame rate is not decreased to below standard video frame rates (15 frames/sec.) The frame rate is not increased in order to keep the relative spacing of key frames to a manageable distance; the faster the frame rate, the closer the key frames must be to achieve the same user travel speed. The viewer may optionally skip key-frames in order to increase the user's travel speed through the environment. The more key-frames skipped, the faster the user will travel; if no key-frames are skipped, the user will travel at the slowest possible rate (given a constant frame rate.)

The system can link pan movie segments so as to permit branching and thereby follow a path selected by a user. Multiple linear (one dimensional) pan movies may be linked together to create a "graph" of pan movies (see appendix B). For each pan movie, the end of one segment may be associated with the start of a "next" pan movie. This association (in conjunction with the length of the individual pan movies) is the basis for the graph shape. In order to achieve smooth transitions, the "last" frame in the "first" pan movie must be the same as (or one frame off from) the "first" frame of the "next" pan movie. In addition to positional correctness, the relative view orientations of the joining frames must be known. For example, if the "last" frame of the "first" pan movie faces "north", and the "first" frame of the "next" Pan Movie faces "east", then the viewing software must be alerted to this orientation change. Without this information, there would be a 90 degree "snap" in the transition between the two Pan Movies. All this graph information may be stored in a separate file (text or binary form.)

The audio information associated with each frame of a pan movie must take into account the fact that a viewer of a pan movie has a great deal of control over what is presented on the screen. In addition to the ability to select branch points a user may choose to change the direction of view or to stop and backup. The audio information associated with each key frame must accommodate this flexibility.

As illustrated in FIG. 11, the audio information stored with each key frame includes five audio tracks designated A, B, C, D, E and control information. FIG. 11 shows eight key frames Fa to Fi each of which has five associated audio tracks and a control field. Audio track A is the track that is played if the pan movie is moving forward in the normal direction at the normal rate of thirty frames per second. Audio track B is the track that is played if the pan movie is being displayed in reverse direction. Audio track C is the audio track that is played if the movie is moving forward at half speed. Audio track D is the track that is played if the movie is being played in the reverse direction at one half speed. Finally audio track E is the track that is repeatedly played if the movie has stopped at one frame. Naturally a variety of other audio tracks could be added for use in a number of other situations. For example, tracks can point to audio clips or to other audio tracks.

The control information that is recorded with each frame controls certain special effects. For example the control information on one frame can tell the program to continue playing the audio tracks from the following frame even if the user has stopped the movie at one particular frame. As the sound track on each frame is played, the control information on that frame is interrogated to determine what to do next. What sound is played at any particular time is determined by a combination of the control information on the particular frame being viewed and the action being taken by the viewer at that time. From a programming point of view, the commands associated with each rack are de-compressed and read when the view window for the associated frame is de-compressed and read. As a particular view window is being displayed (or slightly before) the commands stored in the control field are read and executed so that the appropriate sound can be de-compressed and played when the view window is displayed.

For example the control information could provide the following types of commands:

Stop this audio track if user stops pan movie here (typical setting). If this is not set the audio will continue playing in same direction until audio for this track ends Start or continue to play this audio track if user is viewing pan movie in forward direction (typical setting)

Start or continue to play this audio track backwards if user if viewing pan move in a backwards direction, (note if the same audio information is played is reverse it may be distorted)

Start this audio track when image frames are in motion and being played in a reverse direction. This allows high quality audio to be played while reverse viewing Continue audio track from/on other file structure (branch most likely has occurred) modify volume. This is used to fade out an audio track that may have played ahead earlier Stop all audio tracks Stop this audio track if user slows pan movie playback Start audio file X: where X is a conventional audio file that is separate from the pan movie.

A wide variety of other commands may be implements as desired by the designer of a particular movie.

The audio information can be recorded with a normal recorder when the initial images are recorded or it can be recorded separately. The audio data is merged with the key frames by computer 21. This can be done manually on a frame by frame basis or the process can be automated. When the sound is merged with the key frames the appropriate control information is added.

The attached appendices provide computer programs which implement various aspects of the present invention. These programs are designed to run under a conventional operating system such as the "Windows" operating system marketed by the Microsoft Corporation.

The program given in Appendix A will retrieve frames for a move, correct the perspective in accordance with known equations and then display the images of the movie in sequence.

Appendix B is an example of a link control file for the frames of a pan movie. Appendix C is pseudocode showing how sequences of images are linked to form a pan movie.

The digital technology used in the present invention facilitates upgrading the system as higher speed and higher resolution components become available. For example, the commercially available CCD sensors used in the present embodiment have a resolution of 500 by 5000 pixels per inch. Soon CCD arrays with a resolution of 750 by 750 pixels per inch will be available and soon thereafter CCD arrays with resolutions of 1000 by 1000 pixels per inch will be available. Because of the architecture of the present invention, it will be very easy to replace the present CCD array with a higher resolution array when such arrays become available.

A wide variety of alternative embodiments are possible without departing from the spirit and scope of the invention. For example, the capture rate (that is, the frame rate) of the lenses 41a to 41f and the associated CCD arrays need not all be set to the same frame rate. For example if the view from lens 41f does not change rapidly, this lens could be set to a very slow frame rate, for example, one frame per second, which the other lenses are set to a frame rate of 30 frames per second. The frame rater of each of the lenses is controlled by embedded controller 48, and for this embodiment, embedded controller 48 would merely control the frame rate from each lens independently in response to commands from computer 20.

While the invention has been described herein in an embodiment which produces panoramic movies, it should be understood that the digital camera of the present invention can be used to capture individual panoramic images. For example if one is interested in a panoramic view of a particular scene the embedded computer would be instructed to capture six simultaneous images, one from each lens. The six images would then be seamed into one panorama. have leach lens would In another alternative embodiment, instead of decompressing only the part of a frame that is necessary for a particular view window, sufficient computer power is provided so that the entire frame can be decompressed and then only the portion of the frame necessary for the view window is displayed. If sufficient computer power and transmission bandwidth are available, the compression chips in the capture unit can be eliminated.

In still other alternative embodiments, the connections between some or between all the units could employ wireless technology rather than the technology used in the preferred embodiment described herein. While in the embodiment shown CCD technology is used to sense the images, alternative types of sensing technology can be used. While only two frame rates are selectable in the embodiment shown, in alternative embodiments different or additional frame rates can be used.

The specifications and drawings of co-pending application Ser. No. 09/310,715 filed May 12, 1999 are hereby incorporated herein in their entirety by reference.

While the invention has been shown with respect to preferred embodiments thereof, it should be understood that various changes in form and detail may be made without departing from the sprit and scope of the invention. The applicant's invention is limited only by the appended claims.

APPENDIX A

FRAME RETRIEVAL CODE

```
#include "windows.h"
#include "mmsystem.h"
#include "vfw.h"
include "vfw_spec.h"
#define S_BMIH      sizeof(BITMAPINFOHEADER)
// Externally declared (and allocated) variables
extern UINT currentFrameNumber; // Current Pan Movie file frame number
(user position)
extern HANDLE hFile; // Open file handle of Pan Movie file
extern HIC hic; // Open IC handle (installed compressor)
extern DWORD *Index; // Pan Movie Frame Index (read from file at load
time)
extern LPBITMAPINFOHEADER viewFrame; // Buffer large enough to hold
image the size of the display window
extern LPBITMAPINFOHEADER panFrame; II Buffer large enough to hold
largest uncompressed frame
extern LPBITMAPINFOHEADER compressedFrame; // Buffer large enough to
hold largest compressed frame
// Function prototypes
extern void ViewToPan(int viewWidth,int viewHeight,int panWidth,int
panHeight,float heading,float pitch,float bank,float zoom, POINT *point);
static LPBITMAPINFOHEADER RetrievePanFrame(int frameNumber, RECT
*viewRect);
//
// This function generates a perspectively correct bitmap image given a
user view orientation and travel speed
//
static LPBITMAPINFOHEADER RetrieveViewFrame(float userHeading,float
userPitch,float userBank,float userZoom,int userTravelSpeed)
{
        // Determine Decode BoundingBox
        POINT point;
        RECT localDecompressionRect;
        // Upper left corner of viewFrame
        point.x = 0; point.y = 0;
ViewToPan(viewFrame—>biWidth,viewFrame—>biHeight,panFrame—>biWidth,panFrame—>biHeight,user
Heading,userPitch,userBank,userZoom,&point);
        localDecompressionRect.top     = point.y;
        localDecompressionRect.left    = point.x;
        // Upper right corner of viewFrame
        point.x = viewFrame—>biWidth-1; point.y = 0;
ViewToPan(viewFrame—>biWidth,viewFrame—>biHeight,panFrame—>biWidth,panFrame—>biHeight,user
Heading, userPitch, userBank, userZoom, &point);
        localDecompressionRect.top     = min(localDecompressionRect.top,point.y);
        localDecompressionRect.right   = point.x;
        // Lower left corner of viewFrame
        point.x = 0; point.y = viewFrame—>biHeight-1;
ViewToPan(viewFrame—>biWidth,viewFrame—>biHeight.panFrame—>biWidth,panFrame—>biHeight,user
Heading,userPitch,userBank,userZoom,&point);
        localDecompressionRect.bottom = point.y;
        localDecompressionRect.left    =
min(localDecompressionRect.left,point.x);
        // Lower right corner of viewFrame
        point.x = viewFrame—>biWidth-1; point.y = viewFrame—>biHeight-1;
ViewToPan(viewFrame—>biWidth,viewFrame—>biHeight, panFrame—>biWidth,panFrame—>biHeight,user
```

APPENDIX A-continued

FRAME RETRIEVAL CODE

```
Heading, userPitch, userBank, userZoom, &point);
        localDecompressionRect.bottom=
max(localDecompressionRect.bottom,point.y);
        localDecompressionRect.right  =
max(localDecompressionRect.right,point.x);
        // Get Pan Frame (or "userDecompressionRect" portion thereof)
        currentFrameNumber += userTravelSpeed; // userTravelSpeed is negative
if traveling backwards
        LPBITMAPINFOHEADER pFrame =
RetrievePanFrame(currentFrameNumber, &localDecompressionRect);
        if(pFrame == NULL) {
                currentFrameNumber -= userTravelSpeed;
                return NULL;
        }
        // A very slow warping routine (assumes 24-bit pixels)
        LPBYTE    srcPixels     = ((LPBYTE)pFrame) + S_BMIH;
        LPBYTE    dstPixels     = ((LPBYTE)viewFrame) + S_BMIH
        for(int y = 0; y < viewFrame—>biHeight; y++) {
                for(int x = 0; x < viewFrame—>biHeight; x++) {
                        point.y = y; point.x = x;
ViewToPan(viewFrame—>biWidth,viewFrame—>biHeight,pFrame—>biWidth,pFrame—>biHeight,userHead
ing,userPitch,userBank,userZoom,&point);
                        memcpy(&dstPixels[3*(x + y*viewFrame—>biWidth)],&srcPixels[3*(point.x
+ point.y*pFrame—>biWidth)],3); // supports 24-Bit Pixels only
                }
        }
        return viewFrame
}
//
// This function reads and decompresses a Pan Frame bitmap image from a
Pan Movie file
//
static LPBITMAPINFOHEADER RetrievePanFrame(int frameNumber,RECT
*viewRect)
{
        DWORD d;
        UINT frameSize = Index[frameNumber+1]-Index[frameNumber];
        // Set the file pointer to the start of the requested frame and read in
the bitmap header
        SetFilePointer(hFile,Index[frameNumber],NULL,FILE_BEGIN);
        ReadFiie(hFile,panFrame,S_BMIH,&d,NULL);
        if(panFrame—>biCompression == 0) {     // Uncompressed frame (read rest of
frame and return)
                ReadFile(hFile, ((BYTE*)panFrame)+S_BMIH,frameSize-S_BMIH,&d,NULL);
                return panFrame;
        }
        // Read the remainder of the compressed frame
        *compressedFrame    = *panFrame;
ReadFile(hFile, ((BYTE*)compressedFrame)+S_BMIH,frameSize-S_BMIH,&d,NULL);
        // Set up decompressed bitmap header
        panFrame—>biCompression    = 0;
        panFrame—>biSizeImage      = 0;
        panFrame—>biBitCount       = 24;
        panFrame—>biClrUsed        = 0;
        LPBITMAPINFOHEADER biSrc = compressedFrame;
        LPBITMAPINFOHEADER biDst = panFrame;
        LPBYTE srcPixels        = (BYTE*)biSrc + S_BMIH;
        LPBYTE dstPixels        = (BYTE*)biDst + S_BMIH;
        // If the frame is compressed with Intel Indeo 4 and a local rect was
requested, then perform local decompression
        if(viewRect && biSrc—>biCompression == mmioFOURCC('i','v','4','1')){
// Intel Indeo 4.1
                R4_DEC_FRAME_DATA      StateInfo;
                memset(&StateInfo,0,sizeof(R4_DEC_FRAME_DATA));
                StateInfo.dwSize               = sizeof(R4_DEC_FRAME_DATA);
                StateInfo.dwFourCC          = biSrc—>biCompression;
                StateInfo.dwVersion          = SPECIFIC_INTERFACE_VERSION;
                StateInfo.mtType                = MT_DECODE_FRAME_VALUE;
                StateInfo.oeEnvironment    = OE_32
                StateInfo.dwFlags               = DECFRAME_VALID |
DECFRAME_DECODE_RECT;
                StateInfo.rDecodeRect.dwX     = min(viewRect—>left,viewRect—>right);
                StateInfo.rDecodeRect.dwY     = min(viewRect—>top,viewRect—>bottom);
                StateInfo.rDecodeRect.dwwidth =
abs((viewRect—>right-viewRect—>left))+1;
                StateInfo.rDecodeRect.dwHeight=
abs((viewRect—>bottom-viewRect—>top))+1;
```

APPENDIX A-continued

FRAME RETRIEVAL CODE

```
        ICSetState(hic,&StateInfo,sizeof(R4_DEC_FRAME_DATA));
if(ICDecompressEx(hic,0,biSrc,srcPixels,0,0,biSrc—>biWidth,biSrc—>biHeight,biDst,dstPixels,0,0,biDst-
  biWidth,biDst—>biHeight)
!= ICERR_OK)
                return NULL;
        }
        else { // Decompress entire frame
if(ICDecompressEx(hic,0,biSrc,srcPixels,0,0,biSrc—>biWidth,biSrc—>biHeight,biDst,dstPixels,0,0,biDst-
>biWidth,biDst—>biHeight)
!= ICERR_OK)
                return NULL;
        }
        return panFrame;
}
```

© Infinite Pictures 1998

APPENDIX B

SAMPLE PAN MOVIE LINK CONTROL FILE

```
<------------------------------->
        <— C  |   B —>
              |
              |
              | A
              |
              |
[Segment-A (start)]
File=               "A.pan"
North=              0
[Segment-A (end)]
File=               "A.pan"
North=              0
Link 90=            "Segment-B (start)"
Link 270=           "Segment-C (start)"
[Segment-B (start)]
File=               "B.pan"
North=              90
Link 90=            "Segment-A (end)"
Link 180=           "Segment-C (start)"
[Segment-B (end)]
File=               "B.pan"
```

APPENDIX B-continued

SAMPLE PAN MOVIE LINK CONTROL FILE

```
North=              90
[Segment-C (start)]
File=               "C.pan"
North=              270
Link 270=           "Segment-A (end)"
Link 180=           "Segment-B (start)"
[Segment-C (end)]
File=               "C.pan"
North=              270
```

© Infinite Pictures 1998

APPENDIX C

PSEUDOCODE FOR LINKED PAN MOVIES (VIA CONTROL FILE)

```
GLOBAL FILE controlFile // Control file
GLOBAL STRING currentSegment // The name of the current pan movie
segment
GLOBAL INTEGER currentFrameNumber // The current frame number of the
current Pan Movie
GLOBAL     INTEGER currentHeading // The current user view horizontal pan
orientation
//
// This function will read the control file and determine which linked
segment is closest
// to the current user heading orientation
// It will also determine the new frame number of the new segment
//
BOOLEAN     RetrieveLink( )
{
        INTEGER minAngle
        STRING nextSegment
        if currentFrameNumber == 0
```

APPENDIX C-continued

PSEUDOCODE FOR LINKED PAN MOVIES (VIA CONTROL FILE)

```
                currentSegment = currentSegment + (start)
        else
                currentSegment = currentSegment + (end)
        if no links in section currentSegment of controlFile
                return FALSE
        minAngle      = link angle closest to currentHeading
        nextSegment   = GetString(minAngle)
        if AngleDifference(currentHeading,MinAngle) > 45 degrees
                return FALSE;
        INTEGER nextNorth = GetNorth(nextSegment)
        INTEGER currentNorth = GetNorth(currentSegment)
        currentHeading = currentHeading + (nextNorth - currentNorth)
        currentSegment = nextSegment
        if stringFind(currentSegment,"(end)")
                currentFrameNumber = -1
        else
                currentFrameNumber = 0
        return TRUE
}
```

© Infinite Pictures 1998

What is claimed is:

1. A digital image capture system which includes,
   a digital image capture unit which simultaneously captures a plurality of overlapping digital images utilizing a non-interleaved progressive scan,
   a control computer,
   a control link and a data capture link between said control computer and said image capture unit whereby a digital image from said image capture unit can be transferred to said control computer and said control computer can send control signals to said digital image capture unit.

2. An digital image capture system including a digital image capture unit and a control computer:
   said digital image capture unit including,
   a plurality of lenses pointed in different directions,
   an image sensor associated with each of said lenses,
   image compression circuits for compressing the output of said image sensors an embedded controller for controlling said image sensors to capture progressive scan images,
   said control computer including user input means and image storage means, and a connection between said control computer and said embedded controller for transferring said user input to said embedded controller.

3. A digital image capture system which includes,
   a digital image capture unit which simultaneously captures a plurality of overlapping digital images utilizing a non-interleaved progressive scan,
   said digital image capture unit included a plurality of individual cameras and an embedded controller, each of said individual cameras including a lens system and an individual CCD array, an entire CCD array being associated with each lens, said embedded controlled controlling said individual cameras to simultaneously acquire said overlapping digital images, whereby the simultaneously acquired images can be seamed into a panorama representing a panoramic image at a particular point in time,
   a control computer,
   a control link and a data capture link between said control computer and said image capture unit whereby a digital image from said image capture unit can be transferred to said control computer and said control computer can send control signals to said digital image capture unit.

4. A digital image capture system for capturing a series of panoramic images, including a digital image capture unit and a control computer:
   said digital image capture unit including,
   a plurality of lenses pointed in different directions,
   an entire physically separate image sensor associated with each of said lenses, image compression circuits for compressing the output of said image sensors an embedded controller for controlling said image sensors to sequentially and simultaneously capture overlapping individual progressive scan images, which can be seamed into a series of panoramic images which form a panoramic movie,
   said control computer including user input means, image storage means, and
   a connection between said control computer and said embedded controller for transferring said images to said control computer and said user input to said embedded controller.

* * * * *